(12) United States Patent
Yildirim

(10) Patent No.: US 12,724,856 B2
(45) Date of Patent: Sep. 1, 2026

(54) SECURED ACCELERATED UNIT PROCESSING IN A DISTRIBUTED PROCESSING SYSTEM

(71) Applicant: ADVANCED MICRO DEVICES, INC., Santa Clara, CA (US)

(72) Inventor: Ahmet Artu Yildirim, Issaquah, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 271 days.

(21) Appl. No.: 18/201,675

(22) Filed: May 24, 2023

(65) Prior Publication Data

US 2024/0394346 A1 Nov. 28, 2024

(51) Int. Cl.
*G06F 21/10* (2013.01)
*G06F 21/62* (2013.01)

(52) U.S. Cl.
CPC ........ *G06F 21/109* (2023.08); *G06F 21/1015* (2023.08); *G06F 21/6218* (2013.01)

(58) Field of Classification Search
CPC . G06F 21/109; G06F 21/1015; G06F 21/6218
USPC ........................................................... 726/26
See application file for complete search history.

(56) References Cited

U.S. PATENT DOCUMENTS 7,669,243 B2 * 2/2010 Conti ...................... G06F 21/71 713/165
9,774,573 B2 * 9/2017 Hitchcock ........... H04L 63/0823
2001/0020228 A1 * 9/2001 Cantu .................. H04L 9/3263 380/278
2015/0324554 A1 * 11/2015 Durbha ................ G06F 21/105 726/26
2020/0218821 A1 * 7/2020 Liu ..................... H04L 63/0442
2023/0103518 A1 * 4/2023 Rogers .................... G06F 21/71 726/26
2023/0384951 A1 * 11/2023 Binfet .................. G06F 3/0622

* cited by examiner

*Primary Examiner* — Dant B Shaifer Harriman

(57) ABSTRACT

A distributed processing system includes one or more accelerated units (AUs) connected to a network. To control access to the AUs by one or more users over the network, the distributed processing system includes a control plane circuitry connected to the network. The control plane circuitry is configured to grant a user access to one or more AUs connected to the network based on user security data stored at the control plane circuitry. The security data stored at the control plane circuitry indicates which resources of one or more AUs connected to the network one or more users are authorized to access.

20 Claims, 6 Drawing Sheets

SECURED ACCELERATED UNIT PROCESSING IN A DISTRIBUTED PROCESSING SYSTEM

BACKGROUND

Some distributed processing systems include client machines each connected to a network and configured to support multiple users. For example, such client machines each run one or more virtual machines to support these users. While running these virtual machines, the client machines further support these users by executing applications on behalf of the users. To help execute these applications, such distributed processing systems also include one or more accelerator units (AUs) connected to the network and configured to execute one or more instructions on behalf of the applications running on the client machines. For example, to execute an application for a user, a client machine of a distributed processing system is configured to provide instructions associated with the application to an AU connected to the network. The AU then performs the instructions and provides the results to the client machine. However, within such distributed processing systems, the AUs are vulnerable to attacks from untrusted or malicious users supported by the client machines. For example, in the event that a client machine is supporting a malicious user, the likelihood that the client machine executes a malicious application for the malicious user increases. Such a malicious application, for example, causes an attack on an AU of the distributed processing system by providing instructions to the AU that, when executed, cause the AU to expose sensitive data, cause the AU to be disabled, or both.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
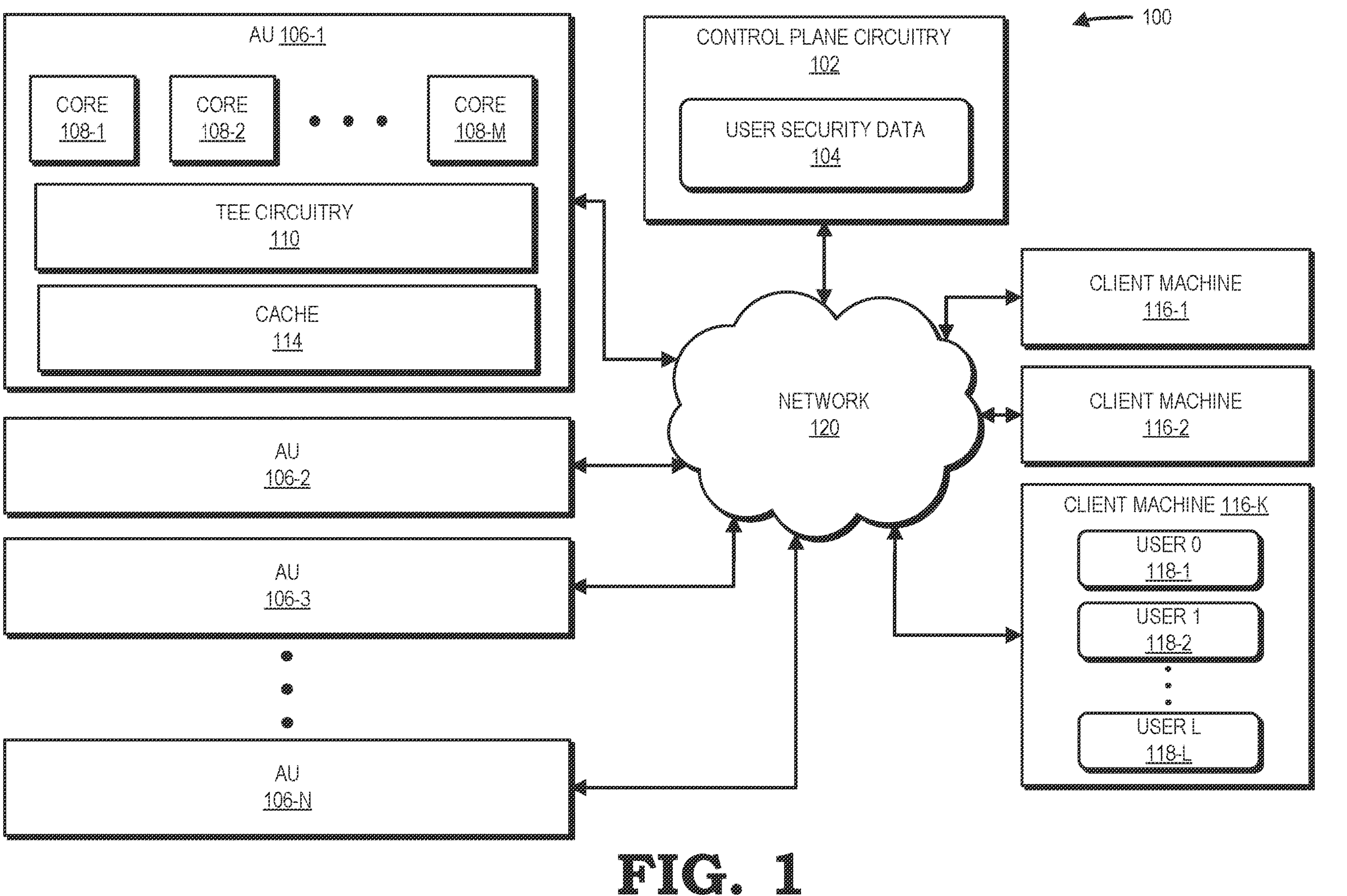
FIG. 1 is a block diagram of a distributed processing system configured for secured accelerator unit (AU) computing, in accordance with some embodiments.

Some distributed processing systems include one or more client machines each connected to a network (e.g., shared data fabric network, local area network (LAN), wide area network (WAN)), and each configured to support one or more users. For example, these client machines each support a user by running a virtual machine for the user. Further, the client machines each include one or more central processing units (CPUs) and memories configured to execute one or more applications for one or more users supported by the client machine (e.g., for the virtual machines running on the client machine). To help execute these applications for the users, such distributed processing systems also include one or more accelerator units (AUs) each connected to the network and each configured to perform one or more instructions on behalf of the applications running on the client devices. For example, when executing an application for a user, a client machine is configured to access one or more AUs connected to the network and issue one or more instructions associated with the application to the AUs. In response to receiving such instructions, the AU then performs the instructions and stores data resulting from the performance of the instructions in a cache, memory, or both of the AU which is then read by the client machine that accessed the AU.

However, within some distributed processing systems, client machines execute applications for one or more untrusted users, malicious users, or both, increasing the likelihood of malicious attacks against the AUs connected to the network. As an example, a malicious attack includes a client machine first executing a malicious application for an untrusted user or a malicious user. While executing the malicious application, the client machine provides malicious instructions associated with the malicious application to one or more AUs connected to the network. The AUs then execute these malicious instructions causing one or more security vulnerabilities. For example, an AU executing these malicious instructions causes the AU to expose sensitive data (e.g., cryptographic keys, protected data, user credentials, memory layouts) to the untrusted user or malicious user of the client machine that supplied the malicious instructions. As another example, an AU executing malicious instructions causes a resource-related attack (e.g., denial of service attack) on the AU by having the AU allocate excessive amounts of global memory or other processing resources to the malicious instructions. Such a resource-related attack results in the AU being disabled for other applications being executed on the distributed processing system.

To help prevent such malicious attacks, techniques and systems described herein are directed to a distributed processing system configured for secured AU computing using a control plane circuitry. To this end, a distributed security system includes one or more AUs and one or more client machines each supporting one or more users connected to a network. Further, to control access to the AUs by the client machines, the distributed processing system includes a control plane circuitry that includes circuitry, one or more processing units, or both to control access to the AUs of the distributed system. To access an AU within the distributed processing system, a client machine executing an application for a user is configured to generate a message including data requesting access to one or more resources (e.g., processor cores, caches, registers, buffers, memories) of an AU and data (e.g., a user identifier) indicating the user associated with the application executing on the client machine (e.g., the user requesting access). After generating the message, the client machine then provides the message to the control plane circuitry. As an example, the client machine first transmits the message to an AU which then forwards the message to the control plane circuitry.

In response to receiving the message, the control circuitry then queries user security data stored in a memory included in or otherwise coupled to the control plane circuitry for restriction data associated with the user identified in the message. The user security data, for example, includes restriction data associated with one or more users previously or currently being supported by a client machine. Such restriction data, for example, includes data indicating that one or more users are not allowed (e.g., not authorized) to access one or more resources of an AU, one or more users are allowed (e.g., authorized) to access one or more resources of an AU, one or more users are associated with a previous malicious attack on an AU, one or more users are not allowed to access any AU, one or more users are not allowed to access certain AUs, or any combination thereof. Based on restriction data associated with the user identified in the received message, the control plane circuitry generates one or more user access sets each identifying one or more resources, if any, of a respective AU the user identified in the message is allowed (e.g., authorized) to access. These access control sets are provided to the client machine that sent the message which then uses a respective access control set to request access to one or more resources of an AU. As an example, when requesting access to one or more resources of an AU for a user, the client machine provides a user access set associated with both the AU and the user to the AU. Based on the user access set, the AU then allows the client machine to access one or more resources of the AU. As an example, the AU allows the client machine to access each resource that the user access set indicates the user is authorized to access. In this way, the control plane circuitry controls access to AUs based on the users associated with the applications requesting access. As such, untrusted users, users known to be associated with previous malicious attacks, known malicious users, or any combination thereof are denied access to certain resources of AUs or AUs entirely, decreasing the likelihood of malicious attacks on the AUs.

Additionally, to help prevent malicious attacks, the control plane circuitry and one or more AUs of the distributed processing system are configured to encrypt and decrypt messages between the control plane circuitry and the AUs using, for example, asymmetric encryption. To this end, one or more AUs each include a trusted execution environment (TEE) circuitry configured to encrypt, decrypt, and sign messages between the AU and the control plane circuitry. For example, in response to receiving a request from a client machine requesting access to one or more resources of an AU and indicating a user associated with the request, the TEE circuitry of the AU is configured to sign (e.g., add a signature to) the request using a private key associated with the AU stored in the TEE circuitry. Further, the TEE circuitry encrypts the signed request using a public key associated with the control plane circuitry and transmits the encrypted request over the network to the control plane circuitry. In response to receiving the encrypted request, the control plane circuitry decrypts the request using a private key associated with the control plane circuitry stored in the memory of the control plane circuitry. The control plane circuitry then validates the signature of the decrypted request using a public key associated with the AU. If the signature is not validated (e.g., is not valid), the control plane circuitry will not allow the user identified in the request to access the AU. If the signature is validated, the control plane circuitry then determines a user access set for the user by querying the user security data stored at the control plane circuitry.

As another example, when generating a permission message including data indicating the AUs a user is allowed to access (e.g., one or more user access sets), the control plane circuitry is configured to sign one or more of the user access sets using the private key of the control plane circuitry and encrypt each user access set using a public key associated with a respective AU (e.g., the AU indicated in the user access set). In response to receiving an encrypted user access set from a user requesting access, an AU decrypts the user access set using the private key of the AU and validates the signature of the user access set using the public key of the control plane circuitry. If the signature of the user access set is not validated (e.g., is invalid), the AU then denies access to the user. If the signature is validated (e.g., is valid), the AU then provides the user access to one or more resources of the AU based on the user access set. In this way, an AU only allows access in response to access messages that have been generated at the control plane circuitry, also decreasing the likelihood of malicious attacks on the AUs from untrusted or malicious users.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions (e.g., a field-programmable gate array (FPGA)), or some combination thereof.

FIG. 1 illustrates a distributed processing system 100 configured for secured accelerator unit (AU) computing, in accordance with some embodiments. In embodiments, distributed processing system 100 includes one or more AUs 106 and one or more client machines 116 each connected to network 120. Network 120, for example, includes a shared data fabric network, LAN, WAN, or any combination thereof configured to communicatively couple each element (e.g., AUs 106, client machine 116, control plane circuitry 102) of distributed processing system 100 together. According to some embodiments, each client machine 116 of distributed processing system 100 is configured to support one or more users 118. As an example, each client machine 116 is configured to run a respective virtual machine for each supported user 118. Additionally, to support these users 118, each client machine 116 is configured to execute one or more applications for the users 118. For example, each client machine 116 includes one or more central processing units (CPUs), memories, or both configured to execute one or more applications for one or more users 118. Though the example embodiment presented in FIG. 1 depicts distributed processing system 100 as including three client machines (116-1, 116-2, 116-K) representing a K number of client machines, in other embodiments, distributed processing system 100 includes any number of client machines 116. According to some embodiments, one or more client machines 116 are configured to execute two or more applications each associated with different users 118 (e.g., virtual machines) concurrently. As an example, a client machine 116 is configured to concurrently execute a first application for a first user 0 118-1 and a second application for a second user 1 118-2. Though the example embodiment presented in FIG. 1 depicts a client machine 116-K as supporting three users (user 0 118-1, user 1 118-2, user L 118-L) representing an L number of users (e.g., virtual machines), in other embodiments, each client machine 116 can execute applications for any respective number of users 118.

To help execute applications for one or more users 118, a client machine 116 is configured to access one or more AUs 106 such that the AUs 106 execute one or more instructions for the applications executing on the client machine 116 (e.g., execute instructions on behalf of a user 118). Each AU 106, for example, includes any of a variety of parallel processors, vector processors, coprocessors, graphics processing units (GPUs), general-purpose GPUs (GPGPUs), accelerated processing units (APUs), non-scalar processors, highly parallel processors, artificial intelligence (AI) processors, inference engines, machine learning processors, other multithreaded processing units, scalar processors, serial processors, simple programmable logics devices, complex programmable logic devices, FPGAs, or any combination thereof. Though the example embodiment presented in FIG. 1 shows distributed processing system 100 including four AUs (106-1, 106-2, 106-3, 106-N) representing an N number of AUs, in other embodiments, distributed processing system 100 includes any number of AUs 106.

For example, in some embodiments, a client machine 116 is configured to send one or more instructions associated with an application executing on the client machine 116 to an AU 106 via network 120. In response to receiving such instructions associated with an application, an AU 106 then executes the received instructions. To perform these instructions, in some embodiments, an AU 106 includes one or more processor cores 108 configured to perform one or more operations for the instructions. As an example, one or more processor cores 108 of an AU 106 are each configured to operate as a compute unit. These compute units each include one or more single instruction, multiple data (SIMD) units that perform the same operation on different data sets to produce one or more results. Such results, for example, include data resulting from the performance of one or more operations by one or more processor cores 108. In some embodiments, after producing one or more results, a compute unit is then configured to store the results in one or more caches 114 within or otherwise coupled to the compute unit (e.g., the processor core 108 operating as a compute unit), a memory (not pictured for clarity) of the AU 106, or both. After these results are stored, the client machine 116 that sent the instructions then reads the results from the cache 114, memory, or both the AU 106. Though the example embodiment presented in FIG. 1 presents an AU 106 as having three processor cores (108-1, 108-2, 108-M) representing an M number of processor cores, in other embodiments, an AU 106 may have any number of processor cores 108.

However, in some embodiments, a client machine 116 is configured to execute one or more malicious applications for one or more untrusted users 118 (e.g., virtual machines associated with untrusted entities), malicious users 118 (e.g., virtual machines associated with malicious entities), or both. Such malicious applications, for example, when executed by a client machine 116, cause the client machine 116 to issue one or more malicious instructions to one or more AUs 106 of the distributed processing system 100. These malicious instructions, for example, cause the AU 106 to expose sensitive data (e.g., cryptographic keys, protected data, user credentials, memory layouts) to a user 118 of the client machine 116 that supplied the malicious instructions, disable the AU 106, or both. As an example, an AU 106 performing malicious instructions causes a resource-related attack (e.g., denial of service attack) on the AU 106 by having the AU 106 allocate excessive amounts of global memory or other processing resources to the malicious instructions. Such a resource-related attack results in the AU 106 being disabled for other applications being executed on the distributed processing system 100.

To help prevent such malicious attacks, distributed processing system 100 includes control plane circuitry 102. Such control plane circuitry 102 includes, for example, circuitry configured to control access to one or more AUs 106 of distributed processing system 100. To this end, control plane circuitry 102 includes user security data 104. For example, control plane circuitry 102 includes or is otherwise connected to a storage (not shown for clarity) that stores user security data 104. User security data 104 includes, for example, restriction data associated with one or more users 118 currently or previously running on the client machines 116. Such restriction data, for example, includes data indicating that one or more user 118 are not allowed (e.g., authorized) to use one or more resources of an AU 106, one or more users 118 are allowed (e.g., authorized) to use one or more resources of an AU 106, one or more users 118 are associated with a previous malicious attack on an AU 106, one or more users 118 are not allowed to access (e.g., authorized to access) any AU 106 of distributed processing system 100, one or more users 118 are not allowed to access certain AUs 106 of distributed processing system 100, or any combination thereof.

Based on user security data 104, control plane circuitry 102 is configured to control access to the AUs 106 by one or more users 118 running on the client machines 116. As an example, in some embodiments, one or more client machines 116 perform a pull operation to request access to one or more resources of one or more AUs 106 for users 118 running on the client machines 116. To this end, according to some embodiments, in response to a user 118 launching on a client machine 116 (e.g., in response to a virtual machine launching on the client machine 116), the client machine 116 is configured to request access to one or more resources (e.g., processor cores 108, caches 114, registers, buffers, memories) of one or more AUs 106 for the launched user 118. To request such access for a user 118, the client machine 116 sends a provision request to control plane circuitry 102 that includes data requesting access to one or more AUs 106 and identifying the user 118. In response to receiving the provision request, the control plane circuitry 102 then queries the user security data 104 to determine restriction data associated with the user 118 identified in the provision request. If the user security data 104 includes no restriction data associated with the user 118 (e.g., the user 118 is unknown to the control plane circuitry 102), the control plane circuitry 102 denies access to the user 118 by, for example, taking no further action. If the user security data 104 does include restriction data associated with the user 118, the control plane circuitry 102 generates a permission message indicating one or more user access sets. Each user access set, for example, identifies one or more resources (e.g., processor cores 108, caches 114, registers, buffers, memories) of a respective AU 106 the user 118 is allowed to access (e.g., authorized to access), one or more resource of a respective AU 106 the user 118 is not allowed to access (e.g., not authorized to access), or any both. For example, the control plane circuitry 102 generates a permission message indicating one or more user access sets each associated with a respective AU 106 and the user 118 identified in the provision request.

The control plane circuitry 102 then sends the permission message to the client machine 116 that sent the provision request. The client machine 116 uses the user access sets from the permission message to request access to AUs 106 for the user 118. For example, to request access to one or more resources of an AU 106 for a user 118, the client machine 116 sends a service access message to the AU 106 that includes the user access set associated with the AU 106 and the user 118 requesting access. The AU 106 then grants access to the resources of the AU 106 based on the user access set. For example, in response to the user access set indicating that the user 118 is authorized to access all the resources of the AU 106, the AU 106 grants unrestricted access to the resources of the AU 106. As another example, in response to the user access set indicating that the user 118 is not authorized to access one or more resources of the AU 106, the AU 106 grants access to the user 118 to one or more resources of the AU 106 but denies access to the resources the user 118 is not authorized to access.

As another example, according to some embodiments, one or more client machines 116 perform a push operation to request access to one or more AUs 106 for users 118 running on the client machines 116. To this end, a client machine 116 is configured to send a service access message to an AU 106 that includes data requesting access to one or more resources of an AU 106 and data identifying a user 118 of the client machine 116. The AU 106 then provides an access request message to the control plane circuitry 102 identifying the user 118 requesting access to the AU 106 and identifying the AU 106. In response to receiving the access request message, the control plane circuitry 102 queries the user security data 104 to determine restriction data associated with the user 118 indicated in the access request message. If the user security data 104 includes no restriction data associated with the user 118 (e.g., the user 118 is unknown to the control plane circuitry 102), the control plane circuitry 102 denies access to the user 118 by, for example, sending a message to the AU 106 indicating that the user 118 is not allowed to access the AU 106. If the user security data 104 does contain restriction data associated with the user 118, the control plane circuitry 102 generates a permission message that includes a user access set indicating which resources, if any, of the AU 106 the user 118 is allowed to access. The control plane circuitry then sends the permission message to the AU 106 that sent the access request message identifying the user 118. The AU 106 then allows the client machine 116 access to one or more resources of the AU 106 for the user 118 based on the user access set included in the permission message. For example, in response to the user access set indicating that the user 118 is authorized to access all the resources of the AU 106, the AU 106 grants unrestricted access to the resources of the AU 106. As another example, in response to the user access set indicating that the user 118 is not authorized to access one or more resources of the AU 106, the AU 106 grants access to the user 118 to one or more resources of the AU 106 but denies access to the resources the user 118 is not authorized to access.

Further, to help prevent malicious attacks on AUs 106, one or more AUs 106 each include a trusted execution environment (TEE) circuitry 110. Such TEE circuitry 110, for example, includes circuitry configured to encrypt, decrypt, and sign messages between an AU 106 and the control plane circuitry 102. Additionally, according to embodiments, control plane circuitry 102 is similarly configured to encrypt, decrypt, and sign messages between an AU 106 and the control plane circuitry 102. For example, a TEE circuitry 110 of an AU 106 and control plane circuitry 102 are configured to perform asymmetric encryption and decryption operations for messages sent between the AU 106 and control plane circuitry 102 in response to a client machine 116 requesting access to the AU 106 for a user 118.

To this end, for example, when a client machine 116 requests access to an AU 106 for a user 118 using a pull operation, a push operation, or both, the control plane circuitry 102 is configured to generate a permission message including one or more user access sets (e.g., data indicating AUs the user 118 is allowed to access, which resources of an AU 106 the user 118 is allowed to access, or both). To generate such a permission message, in embodiments, the control plane circuitry 102 is first configured to sign (e.g., add a hash to, add a signature to) a user access set of the permission message based on a private key associated with the control plane circuitry. The control plane circuitry 102 then encrypts the signed user access set using a public key associated with the AU 106 indicated in the user access set and provides the permission message with the encrypted user data set to a client machine 116, AU 106, or both. Further, in some embodiments, when requesting access to one or more resources of an AU 106 for a user 118, a client machine 116 provides an encrypted user access set received from the control plane circuitry 102 to the AU 106. In response to receiving the encrypted access set, the TEE circuitry 110 of the AU 106 first decrypts the user access set using a private key associated with the AU 106. For example, the TEE circuitry 110 uses a private key stored in the TEE circuitry 110. The TEE circuitry 110 then validates the signature (e.g., hash) of the decrypted user access set based on a public key associated with the control plane circuitry 102. In response to the signature of the user access set not being validated (e.g., being invalid), the AU 106 denies access to the client machine 116. In response to the being validated (e.g., being valid), the AU 106 then grants access to the client machine 116 based on the permissions indicated in the user access set. In this way, an AU 106 of distributed processing system 100 determines that the user access set was provided from control plane circuitry 102 rather than another entity before allowing access to a client machine 116. As such, the likelihood that an untrusted or malicious user gains access to the AU 106 is reduced.

As another example, when a client machine 116 requests access to an AU 106 for a user 118 using a push operation, the AU 106 is configured to generate an access request message identifying a user 118 in response to receiving a service access message from a client machine 116. To generate such an access request message, in some embodiments, the TEE circuitry 110 of the AU 106 is first configured to sign (e.g., add a hash to, add a signature to) the access request message based on the private key associated with the AU 106 (e.g., the private key stored in the TEE circuitry 110). The TEE circuitry 110 then encrypts the signed access request message using a public key associated with the control plane circuitry 102 and provides the encrypted access request message to the control plane circuitry 102. In response to receiving the encrypted access request message, the control plane circuitry 102 decrypts the encrypted access request message using the private key associated with the control plane circuitry 102. Further, the control plane circuitry 102 validates the signature of the decrypted access request message using a public key associated with the AU 106 that sent the encrypted access request message. If the signature of the decrypted access request message is not validated, the control plane circuitry 102 denies access to the user 118 indicated in the access request message by, for example, indicating to the AU 106 that access is denied. If the signature of the decrypted access request is validated, the control plane circuitry 102 then queries user security data 104 and determines a user access set. In this way, the control plane circuitry 102 only generates permission messages and user access sets in response to requests from AUs 106 of the distributed processing system

100 rather than another entity. As such, the likelihood that an untrusted or malicious user gains access to the AU 106 is also reduced.

Figure 2:
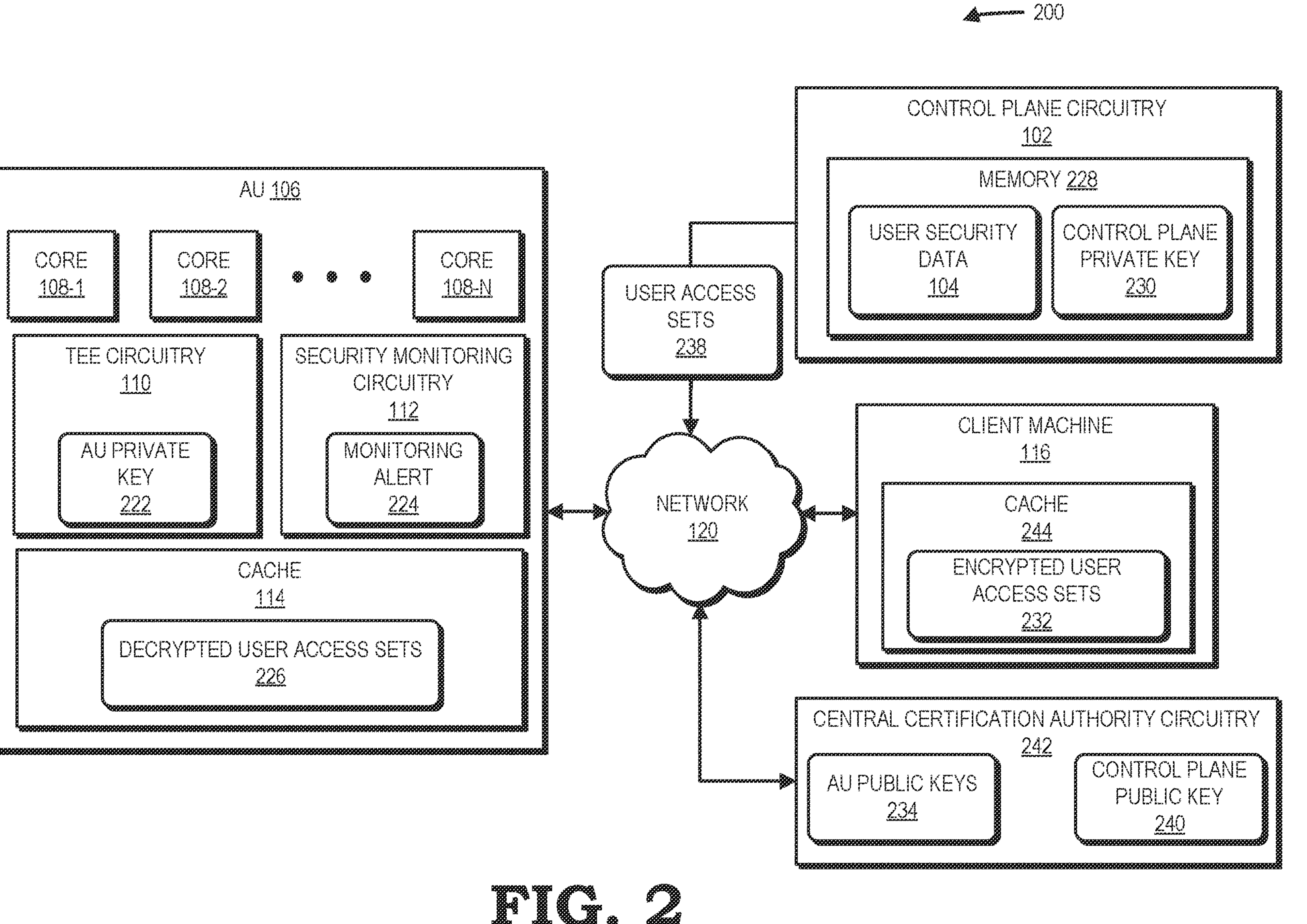
FIG. 2 is a distributed processing system configured to allow access to an AU based on a control plane circuitry, in accordance with some embodiments.

Referring now to FIG. 2, a distributed processing system 200 configured to allow access to an AU based on a control plane circuitry is presented, in accordance with some embodiments. In some embodiments, distributed processing system 200 is a portion of or is otherwise implemented in distributed processing system 100. Within distributed processing system 200, a client machine 116 is configured to request access to an AU 106 for one or more users 118 (e.g., virtual machines) running on the client machine 116. For example, the client machine 116 is configured to request access to an AU 106 such that the AU 106 performs one or more instructions for one or more applications executing on the client machine 116 for a user 118.

To this end, in some embodiments, the client machine 116 is configured to request access to one or more resources of an AU 106 for a user using a pull operation. During such a pull operation, the client machine 116 sends a provision request identifying a user 118 running on the client machine 116 to control plane circuitry 102. For example, in response to the user 118 (e.g., a virtual machine) launching on the client machine 116, the client machine 116 sends the provision request. After receiving the provision request, the control plane circuitry queries user security data 104 to determine restriction data associated with the user 118 identified by the provision request. User security data 104 is stored in a memory 228 included in or otherwise connected to control plane circuitry 102 and includes data indicating restriction data associated with one or more users 118. The restriction data, as an example, includes data indicating one or more users 118 are not allowed (e.g., not authorized) to use one or more resources (e.g., processor cores 108, caches 114, registers, buffers, memories) of an AU 106, one or more users 118 are allowed (e.g., are authorized) to use one or more resources of an AU 106, one or more users 118 are associated with a previous malicious attack on an AU 106, one or more users 118 are not allowed to access any AU 106 of distributed processing system 100, one or more users 118 are not allowed to access certain AUs 106 of distributed processing system 100, or any combination thereof. Memory 228 includes, for example, a dynamic random-access memory (DRAM). However, in embodiments, memory 228 is implemented using other types of memory including, for example, static random-access memory (SRAM), double data rate SDRAM (DDR SRAM), nonvolatile RAM, and the like.

In response to user security data 104 not including any restriction data associated with the user 118 identified in the provision request, the control plane circuitry 102 denies the user 118 access to any AU 106 in distributed processing system 200 by, for example, taking no further action. In response to user security data 104 including restriction data associated with the user 118 identified in the provision request, the AU 106 generates one or more user access sets 238 based on the restriction data associated with the user 118. Each user access set 238, for example, indicates a respective AU 106 the user 118 indicated in the provision request is allowed to access, which resources (e.g., processor cores 108, caches 114, vector registers, memories) of the AU 106 the user 118 is allowed to access, or both. The control plane circuitry 102 then generates a permission message including the user access sets 238 and sends the permission message to the client machine 116 that sent the provision request. According to some embodiments, to generate such a permission message, control plane circuitry 102 is configured to encrypt one or more user access sets 238 of the permission message. To this end, for each user access set 238 to be encrypted, the control plane circuitry 102 first signs (e.g., adds a hash to) a user access set 238 associated with an AU 106 (e.g., a user access set indicating permissions for that AU 106) based on a control plane private key 230 associated with the control plane circuitry 102. In embodiments, the control plane private key 230 is stored in the memory 228 of the control plane circuitry. After signing the user access set 238, the control plane circuitry 102 then encrypts the signed user access set based on an AU public key 234 associated with the AU 106 indicated in the user access set 238 and sends to the permission message with one or more encrypted user access sets 232 to the client machine 116 that sent the provision request. For such public keys, distributed processing system 200 includes a central certification authority circuitry 242 connected to network 120. Such central certification authority circuitry 242 includes circuitry configured to store and transmit one or more AU public keys 234 each representing a public key associated with a respective AU 106 of distributed processing system 100, 200 and control plane public key 240 representing a public key associated with control plane circuitry 102.

According to some embodiments, after receiving a permission message from the control plane circuitry 102, a client machine 116 is configured to store one or more encrypted user access sets 232 included in a permission message in a cache 244 included in or otherwise coupled to a client machine 116. Each encrypted user access set 232 includes, for example, encrypted data indicating the access permissions to a respective AU 106 for a corresponding user 118 (e.g., virtual machines) running on a client machine 116. That is to say, each encrypted user access set 232 includes data indicating whether a corresponding user 118 running on a client machine 116 is allowed to access a respective AU 106, which resources (processor cores 108, registers, caches 114, memories, buffers) of the respective AU 106 the client machine is allowed to access, or both. To request access to an AU 106 for a user 118, a client machine 116 is configured to provide a service access message to the AU 106 that includes an encrypted user access set 232 associated with the user 118 and the AU 106 (e.g., indicating permissions of the user 118 for that AU 106). After receiving the service access message, a TEE circuitry 110 of the AU 106 is configured to decrypt the encrypted user access set 232 using a private key associated with the AU 106 (e.g., AU private key 222). In embodiments, the TEE circuitry 110 of each AU 106 is configured to store the AU private key 222 associated with that AU 106. After decrypting the encrypted user access set 232, the TEE circuitry 110 validates the signature (e.g., hash) of the decrypted user access set 226 (e.g., the signature added by control plane circuitry 102) based on the control plane public key 240 (e.g., the public key associated with the control plane circuitry 102). In response to the signature of the decrypted user access set 226 not being validated (e.g., being invalid), the AU 106 denies access to the client machine 116, by, for example, taking no further actions, sending a message to the client machine 116, or both. In response to the signature of the decrypted user access set 226 being validated (e.g., being valid), the AU 106 allows the client machine 116 to access one or more resources (e.g., processor cores 108, caches 114, registers, memories, buffers) of the AU 106 based on the decrypted user access set 226. For example, the AU 106 allows the client machine 116 to access resources that the decrypted user access set 226 indicates the user 118 is authorized to access.

Further, according to some embodiments, the client machine 116 is configured to request access to the AU 106 for a user 118 by using a push operation. During such a push operation, the client machine 116 is configured to send a service access message to the AU 106 that includes data requesting access to the AU 106 and the user 118 associated with the request (e.g., the user requesting access). In response to receiving the service access message, the TEE circuitry 110 of the AU 106 is configured to sign the service access message using the AU private key 222 associated with the AU 106 (e.g., the AU private key 222 stored in the TEE circuitry 110). The TEE circuitry 110 then encrypts the signed service access message using the control plane public key 240 (e.g., the public key associated with the control plane circuitry 102) and sends the encrypted service access message to the control plane circuitry 102. The control plane circuitry 102 is then configured to decrypt the encrypted service access message based on the control plane private key 230 and validate the signature (e.g., hash) of the decrypted service access message (e.g., the signature added by the AU 106) based on the AU public key 234 associated with the AU. If the signature of the decrypted access service message is not validated, the control plane circuitry 102 denies access to the AU 106 that sent the encrypted access service message by, for example, taking no action, sending a message to one or more AUs 106, or both. If the signature of the decrypted access service message is validated, the control plane circuitry 102 queries the user security data 104 for restriction data associated with the user 118 identified in the decrypted access service message. In response to the user security data 104 not including any restriction data associated with the user 118 (e.g., the user 118 is unknown to the control plane circuitry 102), the control plane circuitry 102 denies access to the AU 106 that sent the encrypted access service message by, for example, taking no action, sending a message to one or more AUs 106, or both In response to the user security data 104 including restriction data associated with the user 118, the control plane circuitry 102 generates a user access set 238 indicating one or more resources, if any, of the AU 106 that sent the encrypted access service message the user 118 is allowed to access. The control plane circuitry 102 then signs the user access set 238 using the control plane private key 230 and encrypts the signed user access set 226 using the AU public key 234 associated with the AU 106 that sent the encrypted access service message. Further, the control plane circuitry 102 sends a permission message including the encrypted user access set to the AU 106 that sent the encrypted access service message. After receiving the permission message including the encrypted user access set, the TEE circuitry 110 of the AU 106 decodes the encrypted user access set based on the AU private key 222. The TEE circuitry 110 then validates the signature of the decrypted user access set 226 (e.g., the signature added by the control plane circuitry 102) based on the control plane public key 240. In response to the signature being invalid (e.g., not being validated), the AU 106 denies access to the client machine 116 by, for example, taking no further action, sending a message to the client machine 116, or both. In response to the signature being valid (e.g., being validated), the AU 106 grants access to one or more resources of the AU 106 based on the decrypted user access set 226. For example, the AU 106 grants access to the resources indicated in the decrypted user access set 226 that the user 118 is allowed to access.

According to some embodiments, to help reduce the time needed to allow or deny access of an AU 106 by a client machine 116 for a user 118, an AU 106 is configured to store one or more decrypted user access sets 226 in a cache included in or otherwise connected to AU 106. As an example, in some embodiments, AU 106 is configured to store one or more decrypted user access sets 226 in a cache included in AU 106. As another example, AU 106 is configured to store one or more decrypted user access sets 226 in a cache connected to network 120. Using the decrypted user access sets 226, an AU 106 is configured to allow or deny access to a client machine 116 based on the user 118 associated with a request (e.g., the user 118 requesting access). For example, in response to receiving a service access message from a client machine 116 identifying a user 118 requesting access, an AU 106 is configured to query a cache 114 for a decrypted user access set 226 associated with the user 118 (e.g., including data indicating the permissions of the user 118). In response to a decrypted user access set 226 associated with the user 118 being in the cache 114, the AU 106 grants access to the client machine 116 based on the permissions indicated in the decrypted user access set 226 associated with the user 118. In this way, the AU 106 grants access to a client machine 116 for a user 118 without first having to sign, encrypt, and send a service access message to the control plane circuitry 102, reducing the time needed to allow access to the AU 106. In some embodiments, an AU 106 is configured to store a decrypted user access set 226 associated with a user 118 while that user 118 is running on a client machine 116. In response to the user 118 no longer running on the client machine 116, the AU 106 is configured to remove (e.g., purge) the decrypted user access set 226 associated with the user 118 from the cache 114.

To further help reduce malicious attacks against an AU 106, one or more AUs 106 of distributed processing systems 100, 200 include a security monitoring circuitry 112. Such a security monitoring circuitry 112, for example, includes circuitry configured to detect one or more malicious attacks against the AU 106. As an example, security monitoring circuitry 112 is configured to detect when AU 106 executes malicious instructions that cause the AU 106 to expose sensitive data to one or more users 118. As another example, security monitoring circuitry 112 is configured to detect when AU 106 executes malicious instructions that cause the AU 106 to allocate a number of resources (e.g., processor cores 108, caches 114, registers, buffers, memories) to a user that is above a predetermined threshold. In response to detecting a malicious attack against the AU 106, the security monitoring circuitry 112 is configured to stop the execution of all instructions on the AU 106 and deny access to all client machines 116 for a predetermined amount of time, until a message from control plane circuitry 102 is received, or both. Further, in response to detecting a malicious attack against the AU 106, the security monitoring circuitry 112 is configured to generate a monitoring alert 224 including data indicating a malicious attack against the AU 106 has occurred, data identifying the AU 106 (e.g., an address), data identifying the users 118 associated with the instructions operating on the AU 106, or any combination thereof. According to some embodiments, the AU 106 is configured to generate a monitoring alert 224 indicating one or more malicious attacks against the AU 106 in response to receiving a command (e.g., callback command) from control plane circuitry 102, client machine 116, or both.

According to some embodiments, one or more AUs 106 are configured to provide a monitoring alert 224 to control plane circuitry 102. For example, in some embodiments, the TEE circuitry 110 of an AU 106 is configured sign (e.g., add a hash, add a signature) to a monitoring alert 224 using the AU private key 222 associated with the AU 106. The TEE circuitry 110 then encrypts the monitoring alert 224 using the control plane public key 240 and sends the encrypted monitoring alert 224 to control plane circuitry 102. After receiving the monitoring alert 224, the control plane circuitry 102 decrypts the monitoring alert 224 using the control plane private key 230 and validates the signature of the monitoring alert 224 using the AU public key 234 associated with the AU 106 that sent the monitoring alert 224. In response to the signature of the monitoring alert 224 being valid (e.g., being validated), the control plane circuitry 102 updates user security data 104 based on the monitoring alert 224. For example, control plane circuitry 102 generates restriction data for one or more users 118 indicated in the monitoring alert 224. As another example, the control plane circuitry 102 generates restriction data that indicates none of the users 118 indicated in the monitoring alert 224 are allowed access to any AU 106 in the distributed processing systems 100, 200. As yet another example, the control plane circuitry 102 generates restriction data that indicates no users 118 indicated in the monitoring alert 224 are allowed access to the AU 106 that sent the monitoring alert 224. In this way, control plane circuitry 102 updates user security data 104 based on users 118 associated with a malicious attack on one or more AUs 106, reducing the likelihood that such users 118 are able to launch subsequent attacks on the AUs 106.

Figure 3:
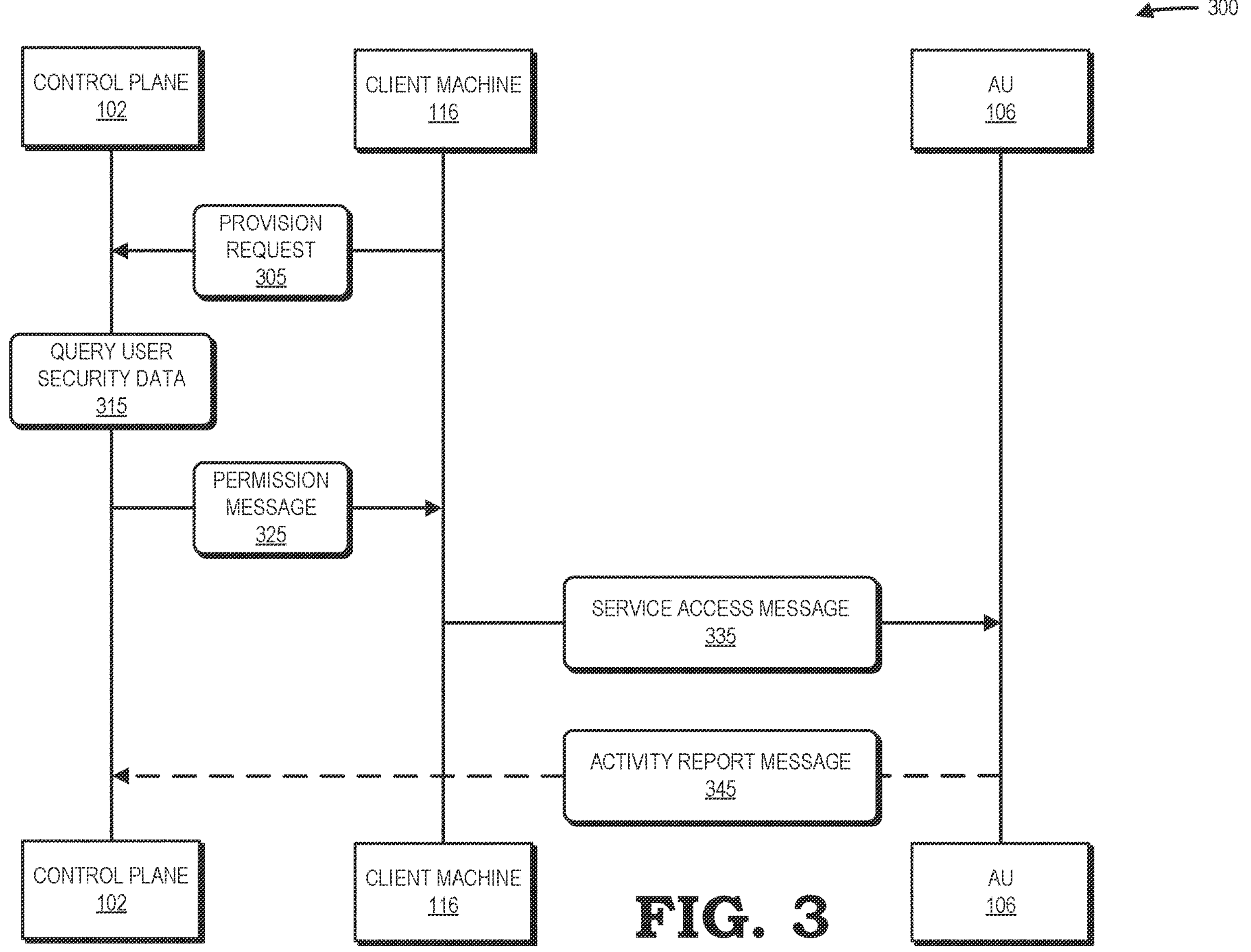
FIG. 3 is a flow diagram of an example pull operation for securing an AU on a distributed processing system, in accordance with some embodiments.

Referring now to FIG. 3, an example pull operation 300 for securing an AU on a distributed processing system is presented, in accordance with some embodiments. According to embodiments, example pull operation 300 is implemented in distributed processing systems 100, 200. In embodiments, example pull operation 300 includes a client machine 116 supporting a user 118 (e.g., running virtual machine for the user 118) sending provision request 305 to the control plane circuitry 102. Provision request 305 includes, for example, data requesting the allocation of one or more AUs 106 to the user 118 supported by the client machine 116 and data identifying the user 118. In embodiments, client machine 116 is configured to generate and provide provision request 305 in response to the user 118 (e.g., a virtual machine) launching on the client machine 116. After receiving provision request 305, the control plane circuitry 102 performs a query user security data operation 315. The query user security data operation 315 includes control plane circuitry 102 querying user security data 104 for restriction data associated with the user 118 identified in provision request 305. Restriction data, for example, includes data indicating that one or more users 118 are not allowed (e.g., not authorized) to access one or more resources of an AU 106, one or more users 118 are allowed (e.g., are authorized) to access one or more resources (e.g., processor cores 108, caches 114, registers, buffers, memories) of an AU 106, one or more users 118 are associated with a previous malicious attack on an AU 106, one or more users 118 are not allowed to access any AU 106, one or more users 118 are not allowed to access certain AUs 106, or any combination thereof. In response to user security data 104 not including any restriction data associated with the user 118 identified in provision request 305 (e.g., the user 118 identified in the provision request 305 is unknown to the control plane circuitry 102), the control plane circuitry 102 denies access to the client machine 116 by, for example, taking no further actions, sending a message to the client machine 116, or both.

In response to user security data 104 including restriction data associated with the user 118 identified in provision request 305, the control plane circuitry 102 generates one or more user access sets 238 each associated with a respective AU 106 and the user 118 based on the restriction data associated with the user 118. That is to say, the control plane circuitry 102 allocates one or more resources of one or more AUs 106 to the user 118 by generating one or more user access sets 238 for the respective AUs 106 based on the restriction data associated with the user 118. Such user access sets 238, for example, including data indicating one or more resources, if any, of an AU 106 a user 118 is allowed to access. After generating one or more user access sets 238, the control plane circuitry 102 generates permission message 325 which includes the user access sets 238. In embodiments, to generate permission message 325, the control plane circuitry 102 is configured to first sign each generated user access set 238 based on a control plane private key 230 (e.g., the private key associated with control plane circuitry 102). Further, the control plane circuitry 102 is configured to encrypt each user access set 238 based on a respective AU public key 234 associated with a corresponding AU 106. For example, for each user access set 238, the control plane circuitry 102 encrypts the user access set 238 using the AU public key 234 associated with the AU 106 indicated in the user access set 238. The control plane circuitry 102 then provides permission message 325 including the encrypted user access sets 232 to the client machine 116 that sent provision request 305.

Example pull operation 300 further includes client machine 116 requesting access to an AU 106 for a user 118, by sending service access message 335 to the AU 106. Service access message 335 includes data requesting access to one or more resources of the AU 106 and an encrypted user access set 232 associated with the user 118 associated with the request. According to embodiments, after receiving service access message 335, the AU 106 (e.g., the TEE circuitry 110 of the AU 106) is configured to decrypt the encrypted user access set 232 included in service access message 335 using the AU private key 222 associated with the AU 106 (e.g., stored in the TEE circuitry 110 of the AU 106). After decrypting the user access set, the AU 106 validates the signature of the decrypted user access set 226 (e.g., the signature added by the control plane circuitry 102) based on the control plane public key 240 (e.g., the public key associated with the control plane circuitry 102). In response to the signature being invalid (e.g., not being validated), the AU 106 denies access to the client machine 116 by, for example, taking no further action, sending a message to the client machine 116, or both. In response to the signature being valid (e.g., being validated), the AU 106 allows the client machine 116 to access one or more resources (e.g., processor cores 108, caches 114, registers, buffers, memories) of the AU 106 based on the decrypted user access set 226.

In some embodiments, example pull operation 300 further includes AU 106 generating activity report message 345 while the client machine 116 has access to the AU 106. Activity report message 345 includes a monitoring alert 224 generated in response to a malicious attack on the AU 106. For example, in response to the security monitoring circuitry 112 of the AU 106 detecting the AU 106 has executed malicious instructions, the AU 106 generates a monitoring alert 224 indicating the user 118 associated with the access by the client machine 116 (e.g., the user 118 that requested access). As another example, in response to the security monitoring circuitry 112 detecting that the AU 106 has allocated a number of resources to the executing instructions equal to or greater than a predetermined threshold value, the security monitoring circuitry 112 detects a malicious attack has occurred (e.g., the AU 106 has executed malicious instructions) and generates a monitoring alert 224 indicating the user 118 that had access to the AU 106 while the malicious attack occurred. The AU 106 then generates activity report message 345 by signing the monitoring alert 224 using the AU private key 222 associated with the AU 106 and encrypting the monitoring alert 224 using the control plane public key 240. After AU 106 generates activity report message 345, AU 106 sends activity report message 345 to the control plane circuitry 102.

In response to receiving activity report message 345, the control plane circuitry 102 is configured to decrypt the monitoring alert 224 of activity report message 345 using the AU public key 234 associated with the AU 106 that sent activity report message 345 and validate the signature (e.g., the signature added by AU 106) of the monitoring alert 224 using the control plane private key 230. If the signature is valid (e.g., is validated), the control plane circuitry 102 then updates user security data 104 based on the decrypted monitoring alert 224. As an example, the control plane circuitry 102 generates restriction data to update user security data 104 that indicates the user 118 identified in the monitoring alert 224 is not allowed access to any AU 106 in the distributed processing systems 100, 200.

Figure 4:
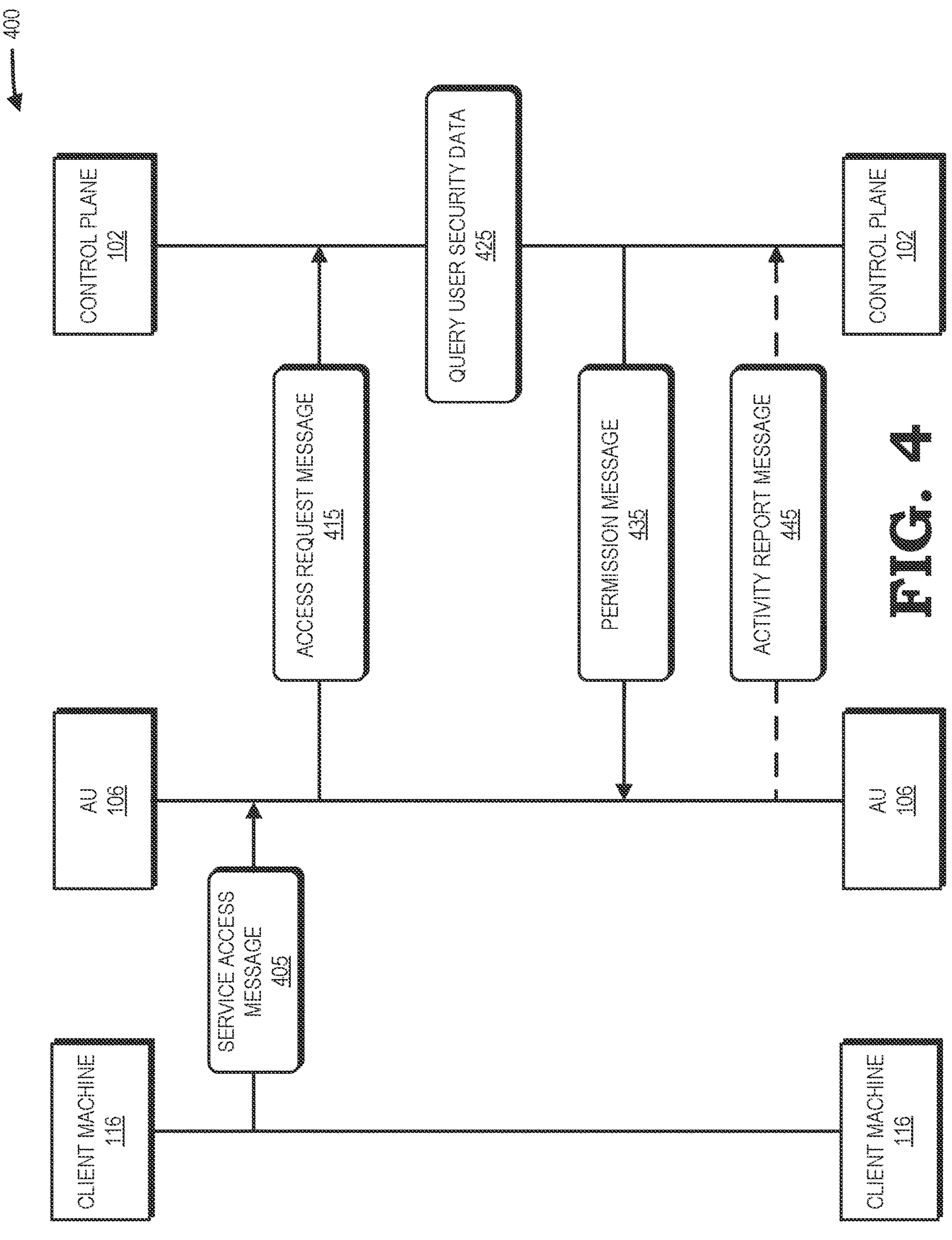
FIG. 4 is a flow diagram of an example push operation for securing an AU on a distributed processing system, in accordance with some embodiments.

Referring now to FIG. 4, an example push operation 400 for securing an AU on a distributed processing system is presented, in accordance with some embodiments. According to embodiments, example push operation 400 is implemented in distributed processing systems 100, 200. In embodiments, example push operation 400 includes a client machine 116 supporting a user 118 (e.g., running a virtual machine for the user 118) sending service access message 405 to an AU 106. Service access message 405 includes, for example, data requesting access to one or more resources of the AU 106 and data identifying the user 118 making the request. In response to receiving service access message 405, the AU 106 (e.g., the TEE circuitry 110 of the AU 106) is configured to first sign service access message 405 using the AU private key 222 associated with the AU 106. The AU 106 then encrypts the signed service access message 405 using the control plane public key 240. After encrypting the signed service access message 405, the AU 106 is configured to send an access request message 415 that includes the encrypted service access message 405 to the control plane circuitry 102.

In response to receiving access request message 415, the control plane circuitry 102 first decrypts the encrypted service access message 405 included in the access request message 415 using the AU public key 234 associated with the AU 106 that sent the access request message 415. Additionally, the control plane circuitry 102 validates the signature of the service access message 405 (e.g., the signature added by the AU 106) using the control plane private key 230. If the signature is invalid (e.g., not validated), the control plane circuitry 102 denies access to the AU 106 that sent access request message 415 by, for example, taking no further actions, sending a message to the AU 106, or both. If the signature is valid (e.g., is validated), the control plane circuitry 102 performs a query user security data operation 315. The query user security data operation 425 includes control plane circuitry 102 querying user security data 104 for restriction data associated with the user 118 identified in the decrypted service access message 405. Restriction data, for example, includes data indicating that one or more users 118 are not allowed (e.g., not authorized) to access one or more resources of an AU 106, one or more users 118 are allowed (e.g., are authorized) to access one or more resources (e.g., processor cores 108, caches 114, registers, buffers, memories) of an AU 106, one or more users 118 are associated with a previous malicious attack on an AU 106, one or more users 118 are not allowed to access any AU 106, one or more users 118 are not allowed to access certain AUs 106, or any combination thereof. In response to user security data 104 not including any restriction data associated with the user 118 identified in the decrypted service access message 405, the control plane circuitry 102 denies access to the AU 106 by, for example, taking no further actions, sending a message to the AU 106, or both.

In response to user security data 104 including restriction data associated with the user 118 identified in the decrypted service access message 405, the control plane circuitry 102 generates a user access set 238 associated with the AU 106 that sent the access request message 415 and the user 118 based on the restriction data associated with the user 118. Such a user access set 238, for example, includes data indicating one or more resources, if any, of the AU 106 the user 118 is allowed to access. After generating the user access set 238, the control plane circuitry 102 generates permission message 435 which includes the user access set 238. In embodiments, to generate permission message 435, the control plane circuitry 102 is configured to first sign the generated user access set 238 based on the control plane private key 230. Further, the control plane circuitry 102 is configured to encrypt the user access set 238 based on the AU public key 234 associated with the AU 106 that sent the access request message 415. The control plane circuitry 102 then provides permission message 435 including the encrypted user access set 232 to the AU 106 that sent the access request message 415.

In embodiments, after receiving permission message 435, the AU 106 (e.g., the TEE circuitry 110 of the AU 106) is configured to decrypt the encrypted user access set 232 included in permission message 435 using the AU private key 222 associated with the AU 106 (e.g., stored in the TEE circuitry 110 of the AU 106). After decrypting the user access set, the AU 106 validates the signature of the decrypted user access set 226 (e.g., the signature added by the control plane circuitry 102) based on the control plane public key 240 (e.g., the public key associated with the control plane circuitry 102). In response to the signature being invalid (e.g., not being validated), the AU 106 denies access to the client machine 116 by, for example, taking no further action, sending a message to the client machine 116, or both. In response to the signature being valid (e.g., being validated), the AU 106 allows the client machine 116 to access one or more resources (e.g., processor cores 108, caches 114, registers, buffers, memories) of the AU 106 based on the decrypted user access set 226.

According to some embodiments, example push operation 400 further includes AU 106 generating activity report message 445 while the client machine 116 has access to the AU 106. Activity report message 445 includes a monitoring alert 224 generated in response to a malicious attack on the AU 106. For example, in response to the security monitoring circuitry 112 of the AU 106 detecting the AU 106 has executed malicious instructions, the AU 106 generates a monitoring alert 224 indicating the user 118 associated with the access by the client machine 116 (e.g., the user 118 that requested access). As another example, in response to the security monitoring circuitry 112 detecting that the AU 106 has allocated a number of resources to the executing instructions equal to or greater than a predetermined threshold value, the security monitoring circuitry 112 detects a malicious attack has occurred (e.g., the AU 106 has executed malicious instructions) and generates a monitoring alert 224 indicating the user 118 that had access to the AU 106 while the malicious attack occurred. The AU 106 then generates activity report message 445 by signing the monitoring alert 224 using the AU private key 222 associated with the AU 106 and encrypting the monitoring alert 224 using the control plane public key 240. After AU 106 generates activity report message 445, AU 106 sends activity report message 445 to the control plane circuitry 102.

After receiving activity report message 445, the control plane circuitry 102 is configured to decrypt the monitoring alert 224 of activity report message 445 using the AU public key 234 associated with the AU 106 that sent activity report message 445 and validating the signature (e.g., the signature added by AU 106) of the monitoring alert 224 using the control plane private key 230. If the signature is valid (e.g., is validated), the control plane circuitry 102 then updates user security data 104 based on the decrypted monitoring alert 224. For example, the control plane circuitry 102 generates restriction data to update user security data 104 that indicates the user 118 indicated in the monitoring alert 224 is not allowed access to any AU 106 in the distributed processing systems 100, 200.

Figure 5:
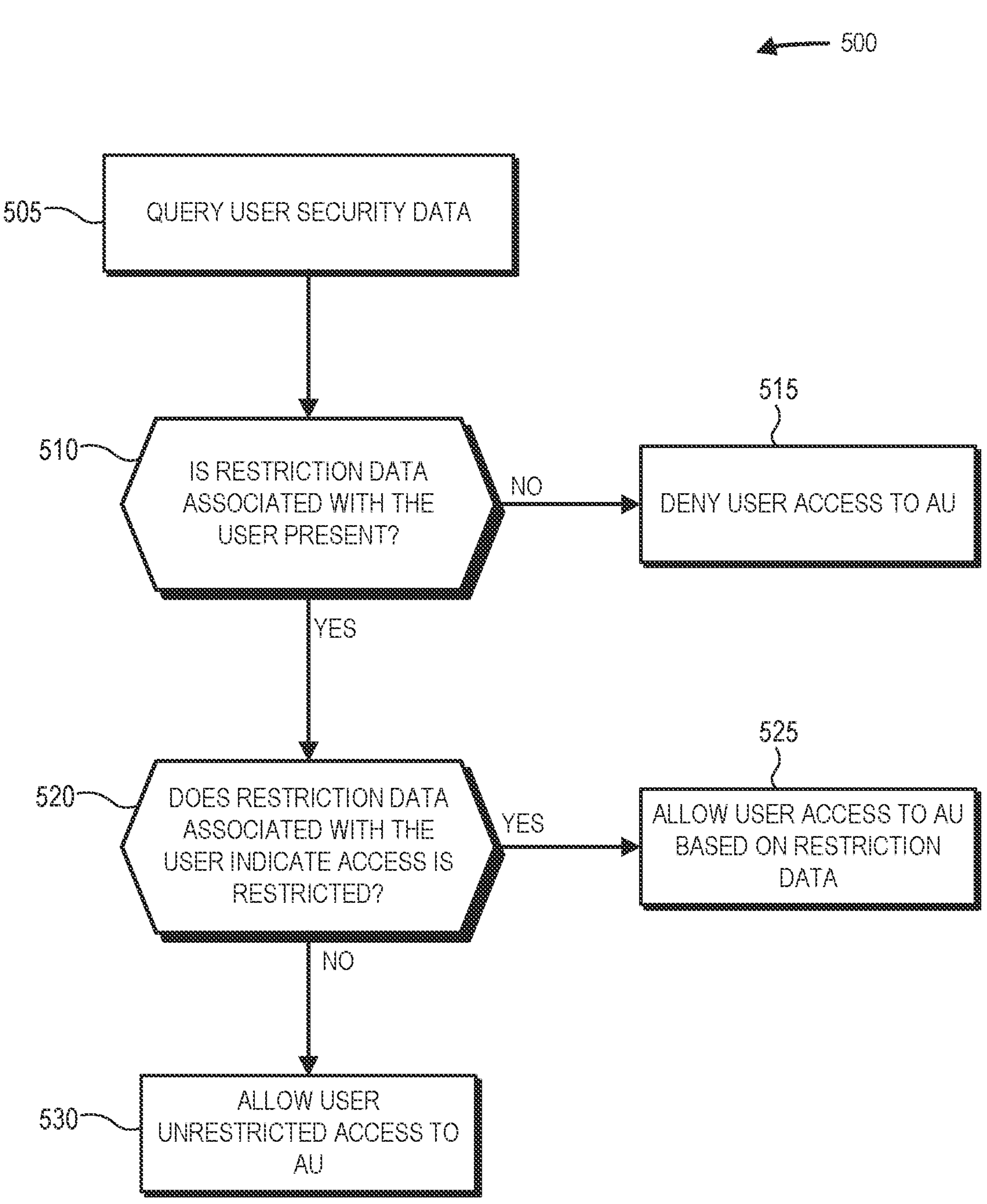
FIG. 5 is a flow diagram of an example method for allowing access to an AU at a control plane circuitry, in accordance with some embodiments.

Referring now to FIG. 5, an example method 500 for allowing access to an AU at a control plane circuitry is presented, in accordance with some embodiments. At step 505 of the example method 500, the control plane circuitry 102 receives a message (e.g., provision request 305, access request message 415) indicating that a user 118 running on a client machine 116 is requesting access to one or more resources of an AU 106. Further, at step 505, the example method 500 includes control plane circuitry 102 querying user security data 104 for restriction data associated with the user 118 requesting access to the AU 106. Restriction data, for example, includes data indicating that one or more users 118 are not allowed to use one or more resources (e.g., processor cores 108, caches 114, registers, buffers, memories) of an AU 106, one or more users 118 are allowed to use one or more resources of an AU 106, one or more users 118 are associated with a previous malicious attack on an AU 106, one or more users 118 are not allowed to access any AU 106, one or more users 118 are not allowed to access certain AUs 106, or any combination thereof. At step 510, the control plane circuitry 102 determines whether user security data 104 includes any restriction data associated with the user 118 requesting access to the AU 106. At step 510, in response to user security data 104 not including any access restrictions associated with the user 118 requesting access to the AU 106, the control plane circuitry 102 moves to step 515. At step 515, the control plane circuitry 102 denies the user 118 access to the AU 106 by, for example, taking no further actions, sending a message to the AU 106, or both.

Referring again to step 510, in response to user security data 104 including restriction data associated with the user 118 requesting access to the AU 106, the control plane circuitry 102 moves to step 520. At step 520, the control plane circuitry 102 determines whether the restriction data associated with the user 118 requesting access indicates that the access of the user 118 to the AU 106 is restricted. For example, the control plane circuitry 102 determines whether the restriction data associated with the user 118 indicates that the user 118 is not authorized to access one or more resources (e.g., processor cores 108, caches 114, registers, buffers, memories) of the AU 106. In response to the restriction data indicating that the access of the user 118 to the AU 106 is not restricted, the control plane circuitry 102 moves to step 530. At step 530, the control plane circuitry 102 allows the user 118 to access the AU 106 without restrictions. For example, the control plane circuitry 102 generates a user access set 238 indicating that an AU 106 is to allow access to the user 118 without restriction. Further, in response to the restriction data indicating that the user 118 is not authorized to access one or more resources of the AU 106, the control plane circuitry 102 moves to step 525. At step 525, the control plane circuitry 102 allows the user 118 to access the AU 106 with one or more restrictions based on the restriction data. For example, the control plane circuitry 102 generates a user access set 238 indicating that the user 118 requesting access is not allowed to access one or more resources of the AU 106.

Figure 6:
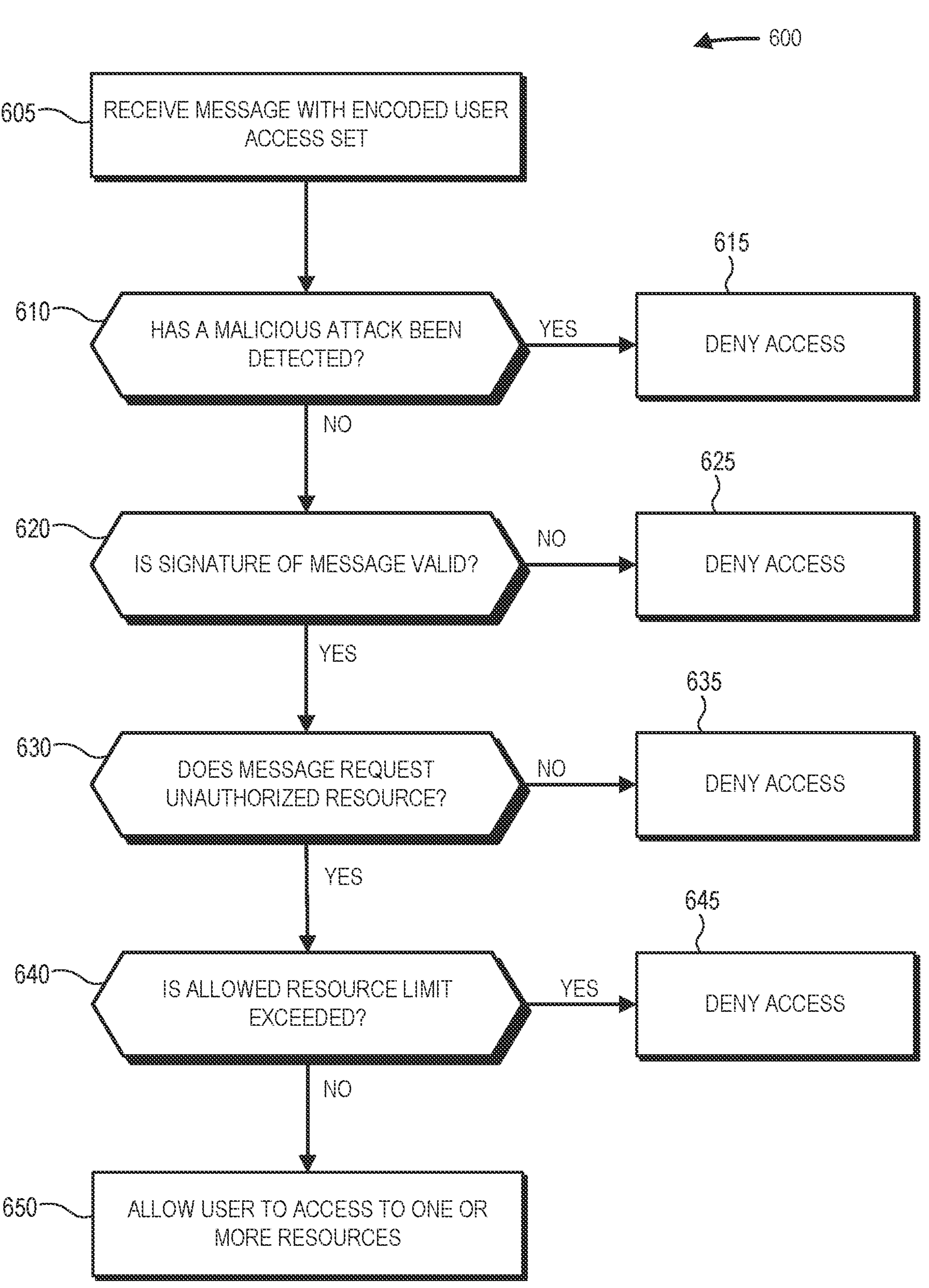
FIG. 6 is a flow diagram of an example method for allowing access to an AU at a trusted execution environment (TEE) of the AU, in accordance with some embodiments.

Referring now to FIG. 6, an example method 600 for allowing access to an AU at a TEE circuitry of the AU is presented. At step 605 of the example method 600, an AU 106 receives a message (e.g., service access message 335, permission message 435) including an encrypted user access set 232 associated with a user 118 requesting access to the AU 106. Such an encrypted user access set 232, for example, includes data indicating which resources (e.g., processor cores 108, caches 114, registers, buffers, memories), if any, of the AU 106 a user 118 requesting access to the AU 106 is allowed to access. At step 610, the AU 106 determines whether a malicious attack has been detected. That is to say, whether AU 106 has generated a monitoring alert 224 in response to security monitoring circuitry 112 detecting one or more malicious attacks on the AU 106 (e.g., detecting the AU 106 has executed malicious code). In response to a malicious attack having been detected (e.g., in response to AU 106 previously generating a monitoring alert 224), the AU 106 moves to step 615. At step 615, the AU 106 denies access to the user 118 requesting access by, for example, taking no further action, sending a message to the client machine 116 running the user 118, or both.

Referring again to step 610, in response to no malicious attack having been detected, the AU 106 moves to step 610. At step 620, the AU 106 determines whether the signature included in the encoded user access set received with the message is valid. To this end, the AU 106 (e.g., the TEE circuitry 110 of the AU 106) first decrypts the encoded user access set based on (e.g., using) the AU private key 222 stored in the TEE circuitry 110 of the AU 106. The AU 106 then validates a signature included in the decrypted user access set based on (e.g., using) the control plane public key 240. In response to the signature being invalid (e.g., in response to determining the encoded user access set is not from the control plane circuitry 102), the AU 106 moves to step 625 and denies access to the user 118 requesting access by, for example, taking no further action, sending a message to the client machine 116 running the user 118, or both. In response to the signature being valid (e.g., in response to determining the encoded user access set is from the control plane circuitry 102), the AU 106 moves to step 630.

At step 630, the AU 106 determines whether the access requested by the user 118 is authorized by the user access set. That is to say, whether the user 118 is requesting access to resources of the AU 106 that is authorized by the user access set. To this end, in embodiments, the AU 106 first identifies one or more resources in the received message (e.g., service access message 335, permission message 435) from the client machine 116 and compares the identified resources to the decrypted user access set. In response to the decrypted user access set indicating that access to one or more of the identified resources is not authorized, the AU moves to step 635 and denies access the user 118 requesting access by, for example, taking no further action, sending a message to the client machine 116 running the user 118, or both. In response to the decrypted user access set indicating that access to the identified resources is authorized, the AU moves to step 640. At step 640 the AU 106 determines whether the number of resources of the AU 106 already allocated to one or more other users 118 exceeds an allowed resource limit threshold value. In response to the number of resources currently allocated to other users 118 being equal to or exceeding the allowed resource limit threshold value, the AU moves to step 645 and denies access the user 118 requesting access by, for example, taking no further action, sending a message to the client machine 116 running the user 118, or both. In response to the number of resources currently allocated to other users 118 being below the allowed resource limit threshold value, the AU 106 moves to step 650 and allows the user 118 to access one or more resources of the AU 106 based on the decrypted user access set.

In some embodiments, the apparatus and techniques described above are implemented in a system including one or more integrated circuit (IC) devices (also referred to as integrated circuit packages or microchips), such as the AU described above with reference to FIGS. 1-6. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A distributed processing system, comprising:

an accelerated unit (AU) connected to a network; and control plane circuitry connected to the network and configured to:

generate an encrypted user access set identifying one or more hardware resources of the AU a user is authorized to access based on user security data indicating one or more users authorized to access the AU; and wherein the AU is configured to, in response to receiving the encrypted user access set, allow the user access to one or more hardware resources of the AU based on the encrypted user access set.

2. The distributed processing system of claim 1, wherein:

the user is associated with a virtual machine executing an application; and the AU is configured to execute one or more instructions for the application using the one or more hardware resources of the AU.

3. The distributed processing system of claim 2, wherein the control plane circuitry is configured to:

sign the user access set based on a private key associated with the control plane circuitry; and encrypt the user access set based on a public key associated with the AU.

4. The distributed processing system of claim 1, wherein the AU is configured to:

decrypt the encrypted user access set to produce a decrypted user access set;

store the decrypted user access set; and purge the decrypted user access set in response to the user no longer being executed.

5. The distributed processing system of claim 1, wherein the control plane circuitry is configured to:

validate a signature of a message received from the AU based on a public key associated with the AU.

6. The distributed processing system of claim 5, wherein the control plane circuitry is configured to:

in response to the signature of the message being invalid, deny the user access to the AU.

7. The distributed processing system of claim 5, wherein the control plane circuitry is configured to:

in response to the signature of the message being valid, query the user security data for data associated with the user, wherein the user security data is stored at the control plane circuitry.

8. The distributed processing system of claim 1, wherein the control plane circuitry is configured to:

in response to the user security data not including data associated with the user, deny the user access to the AU.

9. An accelerated unit (AU), comprising:

one or more processor cores; and trusted execution environment (TEE) circuitry connected to a network and configured to:

receive, over the network, an encrypted user access set associated with a user requesting access to the AU, wherein the encrypted user access set indicates one or more hardware resources of the AU the user is allowed to access and wherein the encrypted user access set is encrypted by control plan circuitry connected to the network; and in response to receiving the encrypted user access set, allow the user to access the one or more hardware resources of the AU based on a signature of the encrypted user access set.

10. The AU of claim 9, wherein the TEE circuitry is configured to:

decrypt the encrypted user access set based on a private key stored in the TEE circuitry.

11. The AU of claim 9, wherein the TEE circuitry is configured to:

validate the signature of the encrypted user access set based on a public key associated with a control plane circuitry connected to the network.

12. The AU of claim 9, wherein the TEE circuitry is configured to:

in response to the signature being invalid, deny the user access to the one or more hardware resources of the AU.

13. The AU of claim 9, wherein the TEE circuitry is configured to:

in response to the signature being valid, grant the user access to the one or more hardware resources of the AU based on the encrypted user access set.

14. The AU of claim 9, further comprising:

a security monitoring circuitry configured to:

deny the user access to the one or more hardware resources of the AU in response to detecting an attack on the AU.

15. The AU of claim 9, wherein the TEE circuitry is configured to:

send an access request message identifying the user to a control plane circuitry connected to the network in response to receiving a message indicating the user is requesting access to the AU.

16. A method, comprising:

receiving, at an AU connected to a network, an encrypted user access set associated with a user requesting access to the AU, wherein the encrypted user access set identifies one or more hardware resources of the AU the user is allowed to access and wherein the encrypted user access set is encrypted at control plane circuitry connected to the network; and in response to receiving the encrypted user access set, allowing, by the AU, the user to access the one or more hardware resources of the AU based on a signature of the encrypted user access set.

17. The method of claim 16, further comprising:

decrypting, at the AU, the encrypted user access set based on a private key stored in a TEE circuitry of the AU.

18. The method of claim 16, further comprising:

validating the signature of the encrypted user access set based on a public key associated with a control plane circuitry connected to the network.

19. The method of claim 18, further comprising:

in response to the signature being invalid, denying the user access to the one or more hardware resources of the AU.

20. The method of claim 18, further comprising:

in response to the signature being valid, granting the user access to the one or more hardware resources of the AU based on the encrypted user access set.

* * * * *